United States Patent
Kitazawa et al.

(10) Patent No.: US 8,203,767 B2
(45) Date of Patent: Jun. 19, 2012

(54) AUTO DOCUMENT FEEDING DEVICE

(75) Inventors: Osamu Kitazawa, Kanagawa (JP);
Masakazu Iwamoto, Kanagawa (JP);
Seiji Iino, Kanagawa (JP); Akihito Tokutsu, Kanagawa (JP); Shinichi Miyakawa, Kanagawa (JP); Mitsunori Ishii, Tokyo (JP)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 312 days.

(21) Appl. No.: 12/610,929

(22) Filed: Nov. 2, 2009

(65) Prior Publication Data

US 2010/0109226 A1    May 6, 2010

Related U.S. Application Data

(60) Provisional application No. 61/112,032, filed on Nov. 6, 2008, provisional application No. 61/112,034, filed on Nov. 6, 2008, provisional application No. 61/112,038, filed on Nov. 6, 2008, provisional application No. 61/138,078, filed on Dec. 16, 2008.

(51) Int. Cl.
*H04N 1/04* (2006.01)
(52) U.S. Cl. ......... 358/498; 358/496; 358/408; 358/488
(58) Field of Classification Search .................. None
See application file for complete search history.

(56) References Cited

U.S. PATENT DOCUMENTS

| 5,953,574 | A | 9/1999 | Okada | |
|---|---|---|---|---|
| 6,273,414 | B1 | 8/2001 | Matsuo | |
| 2009/0251744 | A1 | 10/2009 | Tokutsu | |
| 2011/0007370 | A1* | 1/2011 | Kitazawa et al. | 358/498 |
| 2011/0181926 | A1* | 7/2011 | Tokutsu | 358/498 |
| 2012/0008178 | A1* | 1/2012 | Tokutsu | 358/498 |

FOREIGN PATENT DOCUMENTS

| JP | 2002-199154 | | 7/2002 |
|---|---|---|---|
| JP | 2002199154 | A * | 7/2002 |
| JP | 2004-15299 | A | 1/2004 |
| JP | 2004104247 | A * | 4/2004 |
| JP | 2006-168972 | A | 6/2006 |
| JP | 2007-243875 | | 9/2007 |

OTHER PUBLICATIONS

U.S. Appl. No. 12/492,318, filed Jun. 26, 2009, A. Tokutsu.
Japanese Office Action dated Feb. 9, 2012, filed in Japanese counterpart Application No. 2009-252967, 7 pages (with English translation).

* cited by examiner

*Primary Examiner* — Cheukfan Lee
(74) *Attorney, Agent, or Firm* — Patterson & Sheridan, LLP

(57) ABSTRACT

An auto document feeding device causes an original document passing through an OUT path and an original document passing through an IN path to flow together with overlap a trailing edge of a preceding original document and a leading edge of a following original document. Before the original documents reach to a READ document glass, the auto document feeding device comprises a separating unit configured to separate an overlapping portion of the original documents. The auto document feeding device reduces a distance between the preceding original document and the following original document passing on the READ document glass to nearly 0 mm.

15 Claims, 16 Drawing Sheets

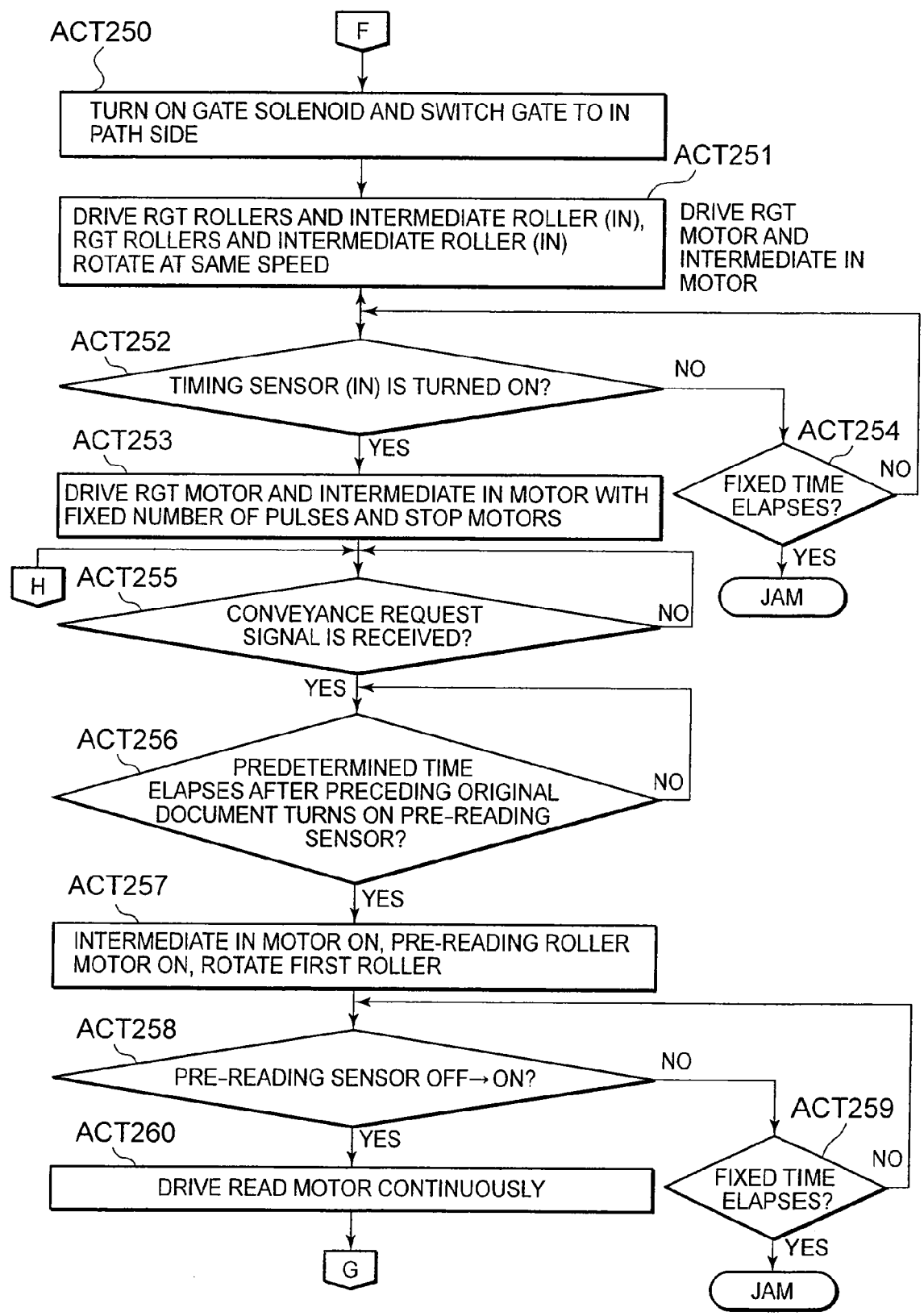

AUTO DOCUMENT FEEDING DEVICE

CROSS-REFERENCE TO RELATED APPLICATION

This application is based upon and claims the benefit of priority from provisional U.S. Applications 61/112,032 filed on Nov. 6, 2008, 61/112,034 filed on Nov. 6, 2008, 61/112,038 filed on Nov. 6, 2008, and 61/138,078 filed on Dec. 16, 2008, the entire contents of which are incorporated herein by reference.

TECHNICAL FIELD

The present invention relates to an auto document feeding device that conveys an original document to an image reading apparatus at high speed.

BACKGROUND

In image reading apparatuses such as a scanner, there is a demand for an increase in image reading speed. There is an apparatus includes plural document conveying paths, a reading sensor that reads a first surface image of an original document and a reading sensor that reads a second surface image of the original document is arranged in each of the conveying paths to increase speed for reading the images on both the surfaces of the original document. As such an image reading apparatus, for example, JP-A-2006-168972 discloses an apparatus including a first branch path for conveying an original document to a first reading position and a second branch path for conveying the original document to a second reading position. Further, for example, JP-A-2004-15299 discloses an apparatus that includes a scanner device and a CIS (Contact Image Sensor) provided across a first conveying path and reads, simultaneously using the scanner device and the CIS, both surfaces of an original document conveyed on the first conveying path.

However, both the apparatuses are not applicable to an increase in image reading speed in continuously reading original documents using the same reading sensor.

Therefore, there is a demand for an auto document feeding device that conveys, in continuously reading original documents with the same reading sensor, the original documents to an image reading position at high sped without damaging the original documents, realizes efficient document reading, and realizes an increase in image reading speed.

SUMMARY

According to an aspect of the present invention to eliminate a state in which an image reading unit waits for original documents to be conveyed thereto and continuously and safely convey the original documents to the image reading unit.

According to an embodiment, an auto document feeding device includes a first conveying path configured to reach from a document placing unit to a first image reading unit; a second conveying path configured to reach from the document placing unit to the first image reading unit and have a path different from the first conveying path; a gate unit configured to direct original documents, which are sent from the document placing unit, to the first conveying path or the second conveying path; a document conveying unit includes a first conveyance mode which conveying the original documents with overlap a trailing edge of a preceding original document and a leading edge of a following original document, when the gate unit alternately directs the original documents from the document placing unit to the first conveying path or the second conveying path, and a separating unit configured to separate the overlap of the trailing edge of the preceding original document and the leading edge of the following original document before the leading edge of the following original document reaches the first image reading unit.

DESCRIPTION OF THE DRAWINGS

FIG. 8 is a flowchart for explaining conveyance of a following original document performed by using an IN conveying unit according to the embodiment;

DETAILED DESCRIPTION

Figure 1:
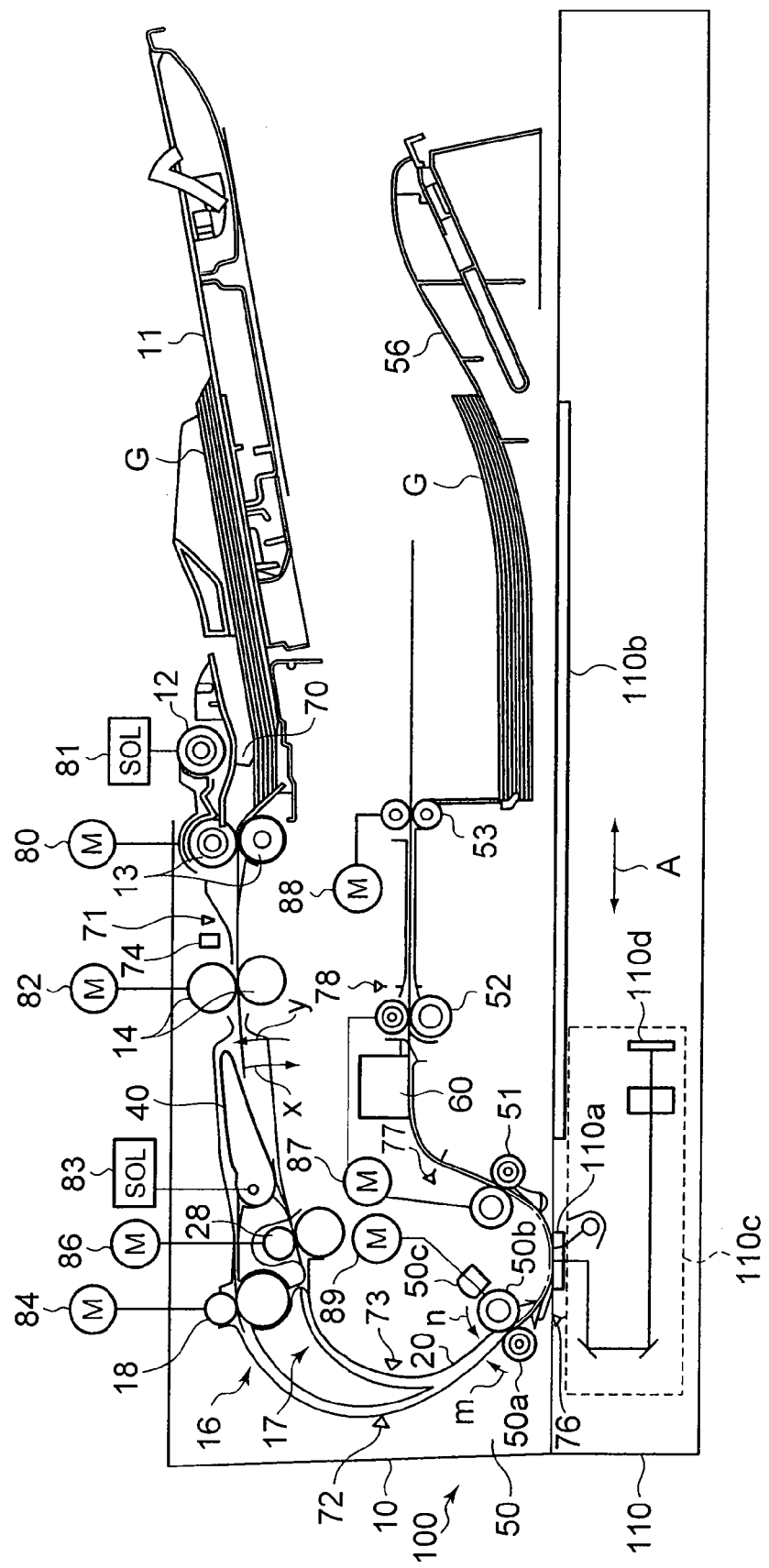
FIG. 1 is a schematic structural diagram of an image reading apparatus according to an embodiment.

An embodiment is explained below. FIG. 1 is an image reading apparatus 100 according to the embodiment. The image reading apparatus 100 includes a scanner 110 as an image reading unit and an auto document feeding device (ADF) 10 that conveys an original document G to the scanner 110. The scanner 110 includes a READ document glass 110a and a platen glass 110b. The scanner 110 includes an optical mechanism 110c. The optical mechanism 110c optically reads an image of the original document G traveling on the READ document glass 110a. Alternatively, the optical mechanism 110c is moved in an arrow a direction (see FIG. 1) along the platen glass 110b by not-shown driving means and optically reads the image of the original document G placed on the platen glass 110b. The scanner 110 includes a CCD (Charge Coupled Device) 110d that photoelectrically converts a optical signal from the optical mechanism 110c into an electric signal.

The ADF 10 includes a document tray 11 as a document placing unit, a pickup roller 12 that draws the original document G from the document tray 11, and a separating and paper feeding rollers 13 that prevent double-feed of the original document G. The ADF 10 includes a registration rollers (RGT rollers) 14 that align the leading edge of the original document G drawn from the document tray 11 and conveyed. The ADF 10 includes two paths, i.e., an OUT path 16 as a first conveying path that reaches from the RGT rollers 14 to the scanner 110 and an IN path 17 as a second conveying path that reaches from the RGT rollers 14 to the scanner 110. The OUT path 16 includes an intermediate OUT roller 18. The IN path 17 includes an intermediate IN roller 28.

The ADF 10 includes a gate 40 that directs the original document G, which is drawn from the document tray 11 and finished passing through the RGT rollers 14, to either the OUT path 16 or the IN path 17. The pickup roller 12, the separating and paper feeding rollers 13, the RGT rollers 14, the gate 40, the intermediate OUT roller 18, and the intermediate IN roller 28 configure a document conveying unit.

The ADF 10 includes a pre-reading roller 50 as a separating unit including a first roller 50a and a second roller 50b that convey the original document G, which finishes passing through the OUT path 16 or the IN path 17, to the READ document glass 110a of the scanner 110. The first roller 50a and the second roller 50b of the pre-reading roller 50 rotate following each other. During driving rotation of the first roller 50a, the second roller 50b rotates following the first roller 50a. During driving rotation of the second roller 50b, the first roller 50a rotates following the second roller 50b. The pre-reading roller 50 changes the driving of the first roller 50a and the second roller 50b with a change mechanism 50c.

Figure 2A:
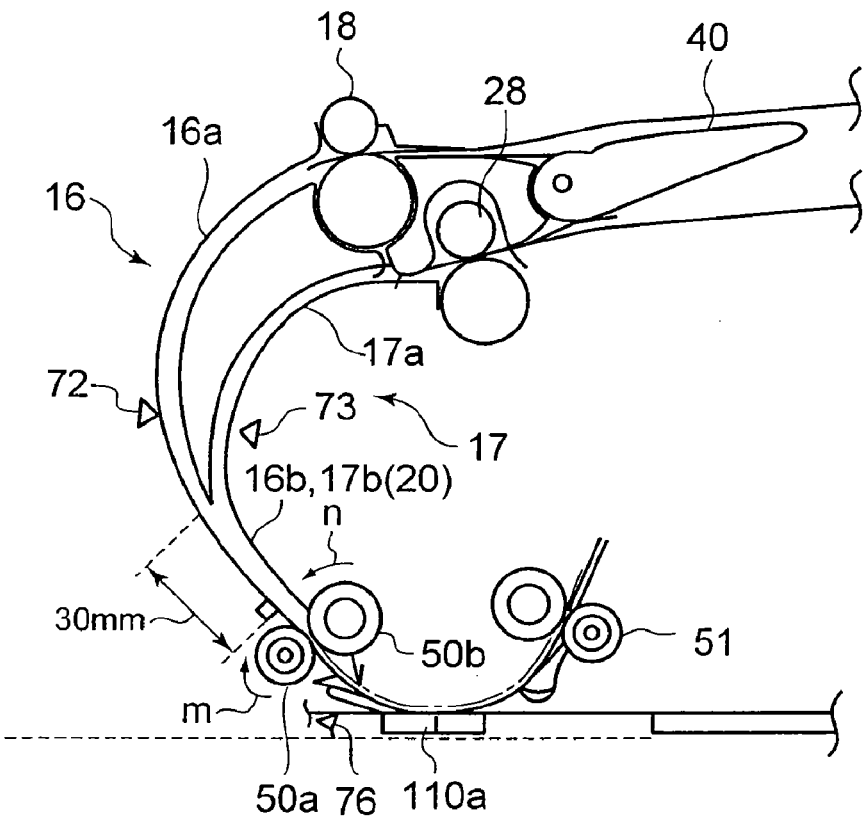
FIG. 2A is a schematic structural diagram of an OUT path and an IN path according to the embodiment.

As shown in FIG. 2A, the OUT path 16 includes a first conveying path 16a as a first pass formed in an arc shape. The OUT path 16 includes a first conveying unit 16b that reaches from an end of the first reversing path 16a to the pre-reading roller 50. The IN path 17 includes a second conveying path 17a as a second pass formed in an arc shape. The IN path 17 includes a second conveying unit 17b that reaches from an end of the second reversing path 17a to the pre-reading roller 50. A radius of the second conveying path 17a of the IN path 17 is smaller than a radius of the first conveying path 16a of the OUT path 16. A part of the first conveying unit 16b and the second conveying unit 17b configures a common conveying unit 20. The length of the common conveying unit 20 is set to, for example, 30 mm such that a difference between postures in the document glass 110a of the original documents G conveyed from the first conveying path 16a and the second conveying path 17a is minimized. An end on the pre-reading roller 50 side of the common conveying unit 20 is formed substantially in parallel to a tangential line in a nip position between the first roller 50a and the second roller 50b of the pre-reading roller 50.

The ADF 10 includes a post-reading roller 51 for discharging the original document G from the READ document glass 110a, a pre-paper discharge roller 52, a paper discharge roller 53, and a paper discharge tray 56. The post-reading roller 51, the pre-paper discharge roller 52, and the paper discharge roller 53 configure a paper discharge unit. A contact image sensor (CIS) 60 as a second image reading unit is provided between the post-reading roller 51 and the pre-paper discharge roller 52. The CIS 60 may be provided in a conveying path between the pre-paper discharge roller 52 and the paper discharge roller 53.

The scanner 110 reads an image of a front surface as a first surface of the traveling original document G at a position of the READ document glass 110a. The CIS 60 reads an image of a rear surface as a second surface of the traveling original document G. This makes it possible to read the images of both the surfaces of the original document G by causing the original document G to pass the ADF 10 once.

An empty sensor 70 that detects presence or absence of the original document G is provided in the document tray 11. A registration sensor (RGT sensor) 71 that detects the arrival of the original document G at the RGT rollers 14 is provided between the separating and paper feeding rollers 13 and the RGT rollers 14. A timing sensor OUT 72 that detects the original document G passing through the OUT path 16 is provided in the OUT path 16. A timing sensor IN 73 that detects the original document G passing through the IN path 17 is provided in the IN path 17. An ultrasonic sensor 74 that detects the thickness of the original document G is provided in a position adjacent to the RGT sensor 71.

A pre-reading sensor 76 is provided between the pre-reading roller 50 and the READ document glass 110a. A post-reading sensor 77 is provided between the post-reading roller 51 and the pre-paper discharge roller 52. A paper discharge sensor 78 is provided between the pre-paper discharge roller 52 and the paper discharge roller 53.

The pickup roller 12 and the separating and paper feeding rollers 13 are driven to rotate by a paper feeding motor 80. The pickup roller 12 is swung by a pickup solenoid 81. The RGT rollers 14 are driven to rotate by a registration motor (RGT motor) 82. The gate 40 is switched by a gate solenoid 83. When the gate solenoid 83 is turned off, the gate 40 pivots in an arrow x direction and directs the original document G to the OUT path 16. When the gate solenoid 83 is turned on, the gate 40 pivots in an arrow y direction and directs the original document G to the IN path 17.

The intermediate OUT roller 18 is driven to rotate by an intermediate OUT motor 84. The intermediate IN roller 28 is driven to rotate by an intermediate IN motor 86. The pre-reading roller 50 is driven to rotate by a pre-reading roller motor 89. The post-reading roller 51 and the pre-paper discharge roller 52 are driven to rotate by a READ motor 87. The paper discharge roller 53 is driven to rotate by a paper discharge motor 88.

Figure 2B:
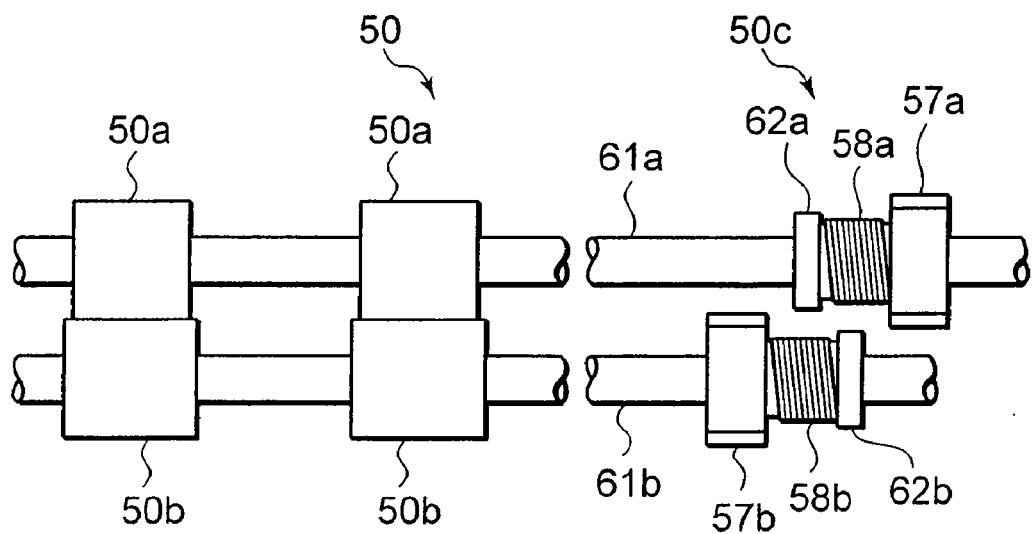
FIG. 2B is a schematic structural diagram of a pre-reading roller according to the embodiment.

The pre-reading roller motor 89 switches the driving of the pre-reading roller 50 via the change mechanism 50c. The change mechanism 50c includes a first driving input gear 57a and a second driving input gear 57b that mesh with a gear of the pre-reading roller motor 89 as shown in FIG. 2B. The first driving input gear 57a drives a first boss 62a coupled to a first shaft 61a which fixes the first rollers 50a via a first spring 58a as a clutch spring.

The second driving input gear 57b drives a second boss 62b coupled to a second shaft 61b which fixes the second rollers 50b via a second spring 58b as a clutch spring.

The second driving input gear 57b drives a second boss 62b coupled to a second shaft 61b of the second roller 50b via a second spring 58b. The first roller 50a driving rotates in an arrow m direction according to the rotation of the first driving input gear 57a. The second roller 50b driving rotates in an arrow n direction according to the rotation of the second driving input gear 57b.

The first spring 58a and the second spring 58b which constitute a separating unit perform as a torque limiter in case that the each pre-reading roller 50 which mounts the first spring 58a or the second spring 58b respectively comes to a driven roller. In case that the first roller 50a driving rotates in an arrow m direction as a driving roller, the second spring 58b runs idle and the second roller 50b comes to a driven roller when there is one original document or nothing between the first roller 50a and the second roller 50b. The second roller 50b separates overlapped original documents by idling torque of the second spring 58b when the trailing edge of the preceding original document and the leading edge of the following original document overlap each other and go in to between the first roller 50a and the second roller 50b. In case that the second roller 50b driving rotates in an arrow n direction as a driving roller, the first spring 58a runs idle and the first roller 50a comes to a driven roller when there is one original document or nothing between the first roller 50a and the second roller 50b. The first roller 50a perform as a separating roller when the trailing edge of the preceding original document and the leading edge of the following original document overlap each other and go in to between the first roller 50a and the second roller 50b.

Figure 3:
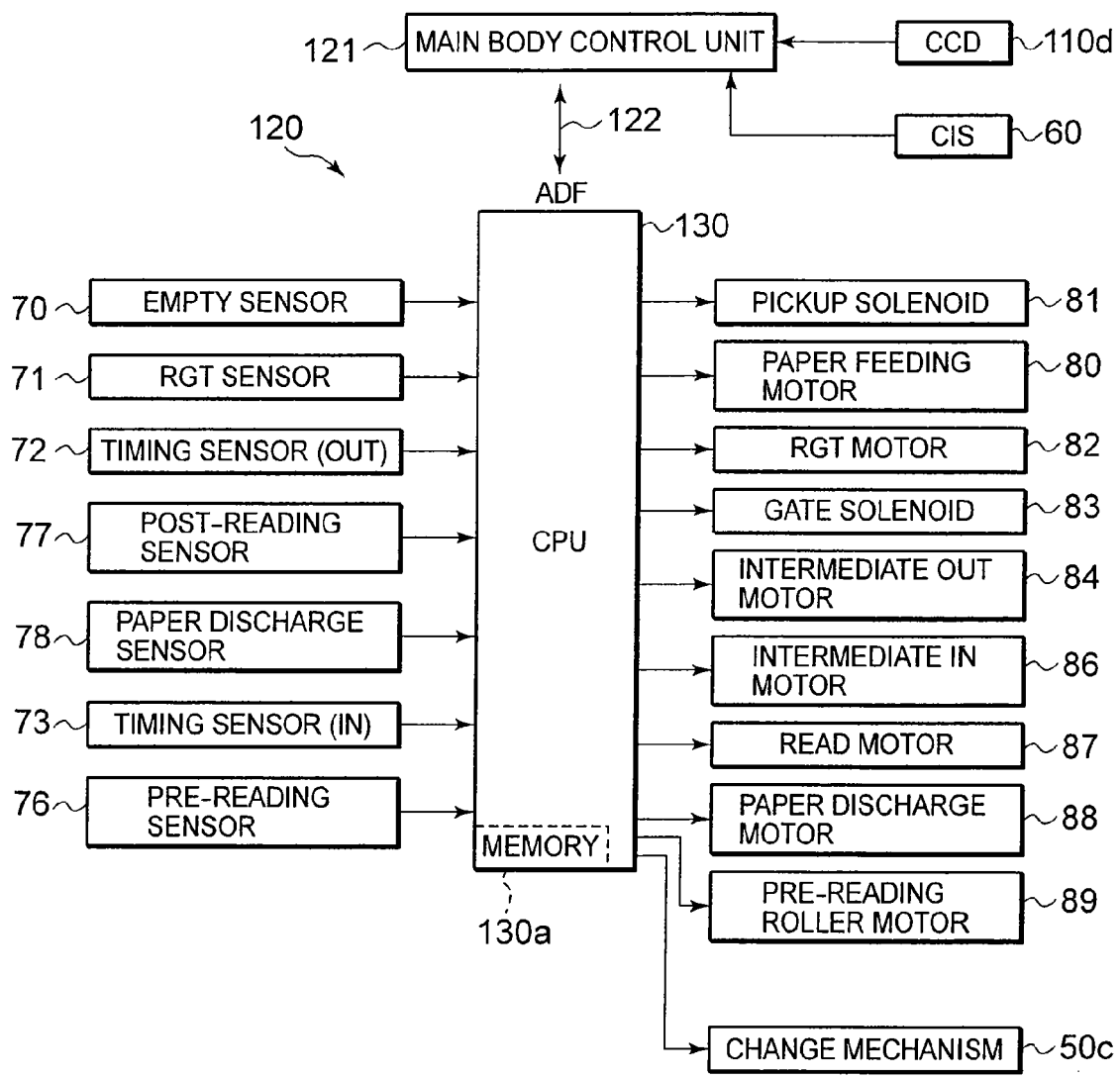
FIG. 3 is a block diagram of a control system of an ADF according to the embodiment.
Figure 4:
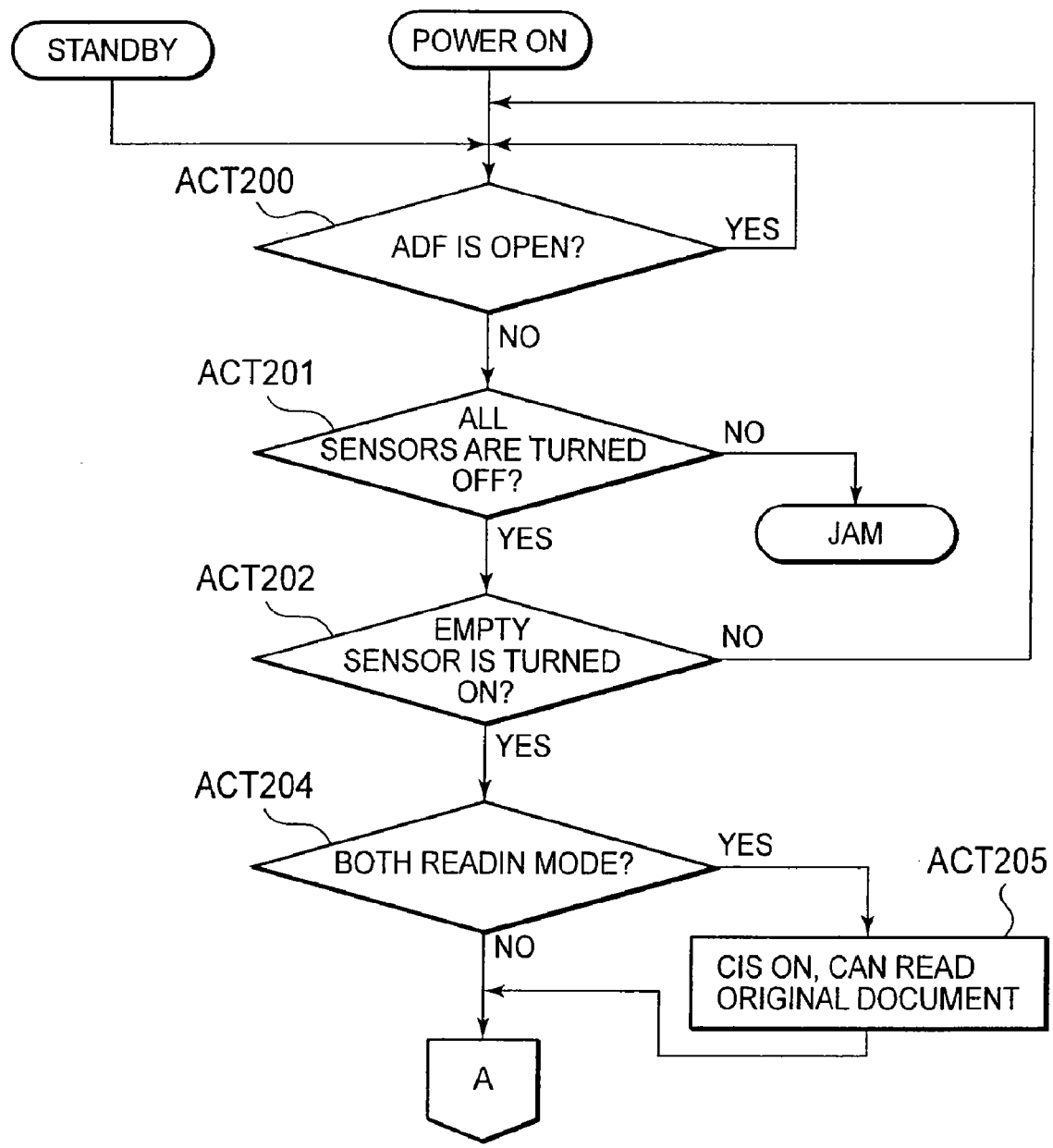
FIG. 4 is a flowchart for explaining processing from power-on to the start of feeding of an original document according to the embodiment.
Figure 5:
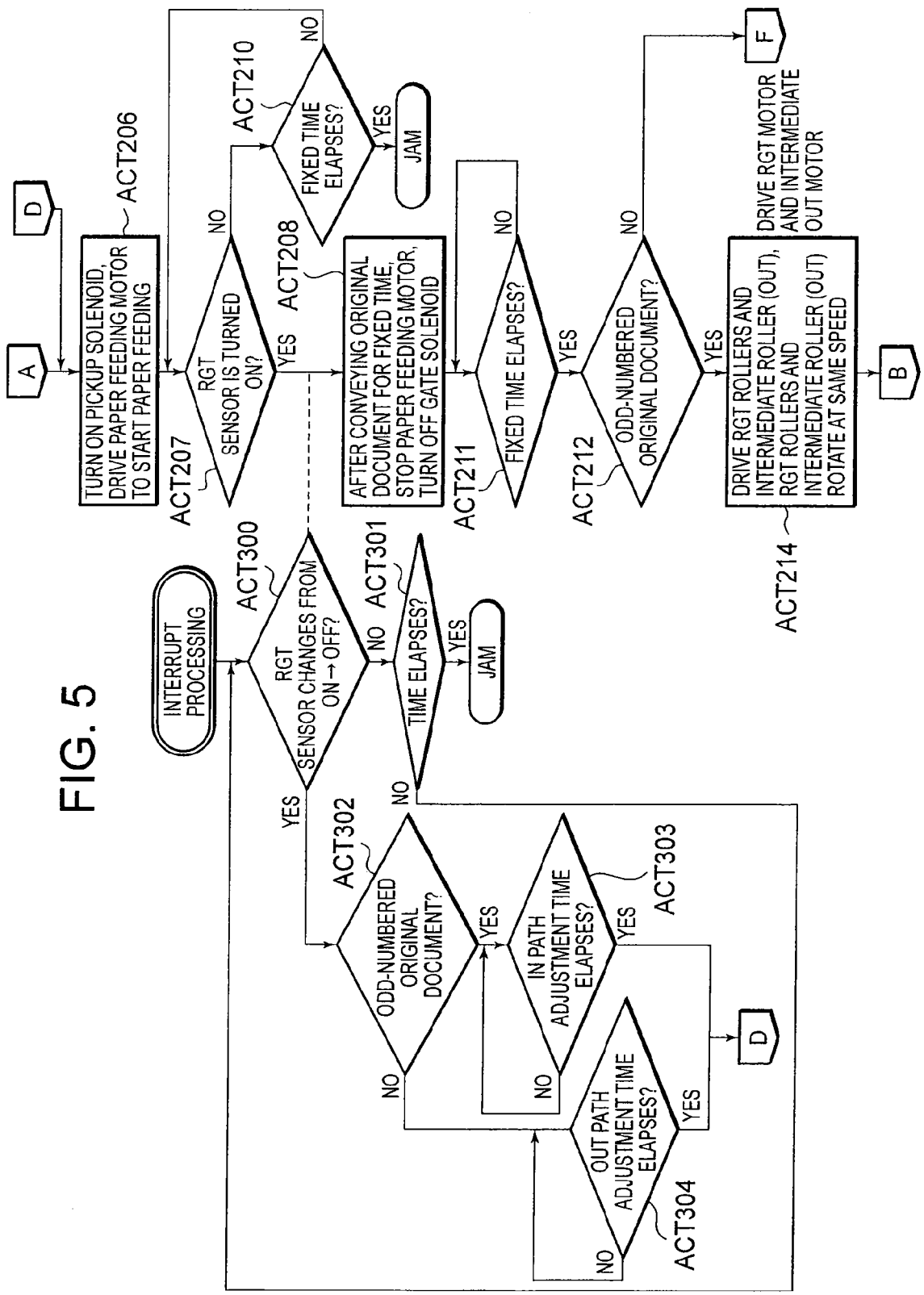
FIG. 5 is a flowchart for explaining processing from feeding of an original document to conveyance of the original document to an OUT conveying unit according to the embodiment.
Figure 6:
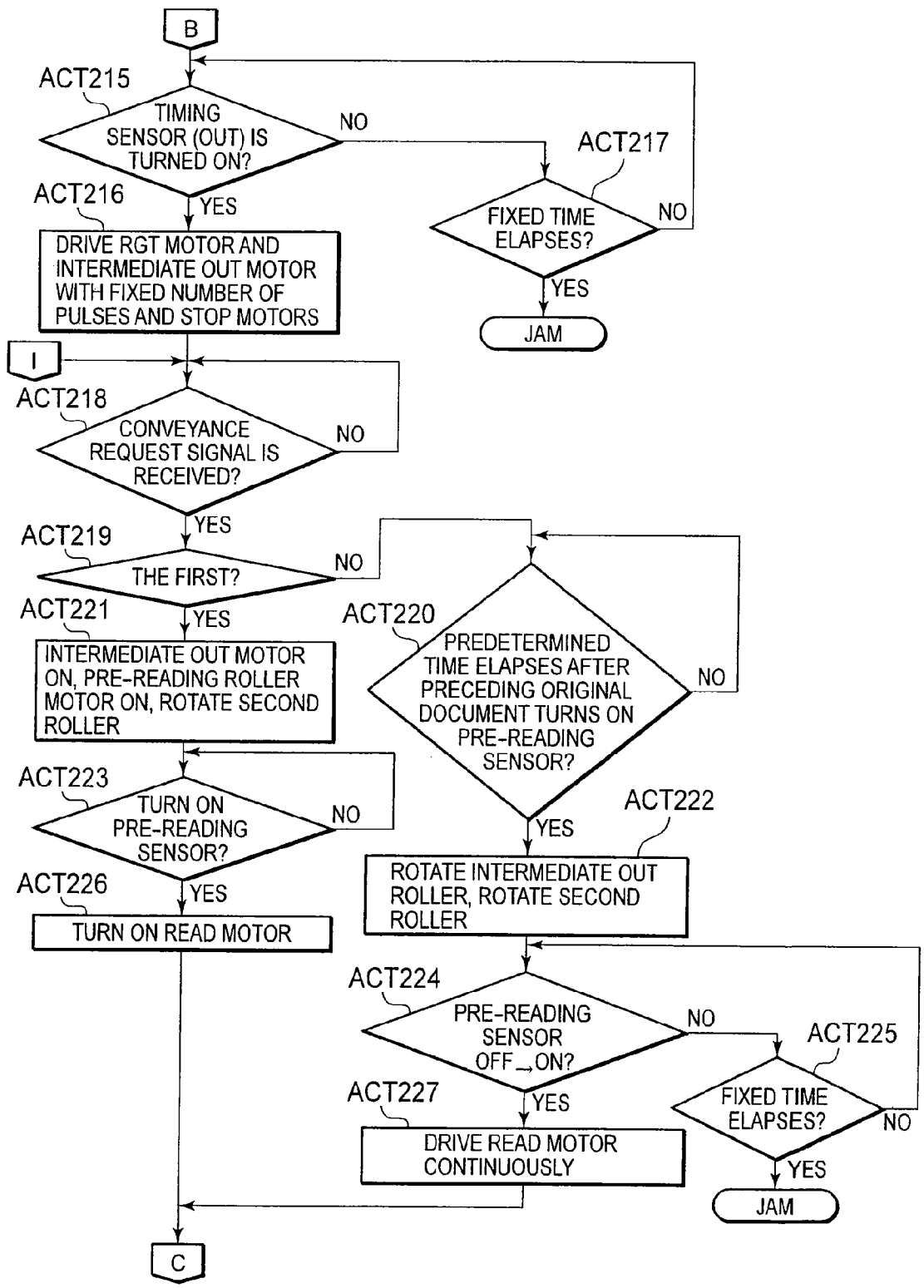
FIG. 6 is a flowchart for explaining conveyance of an original document performed by using the OUT conveying unit according to the embodiment.
Figure 7:
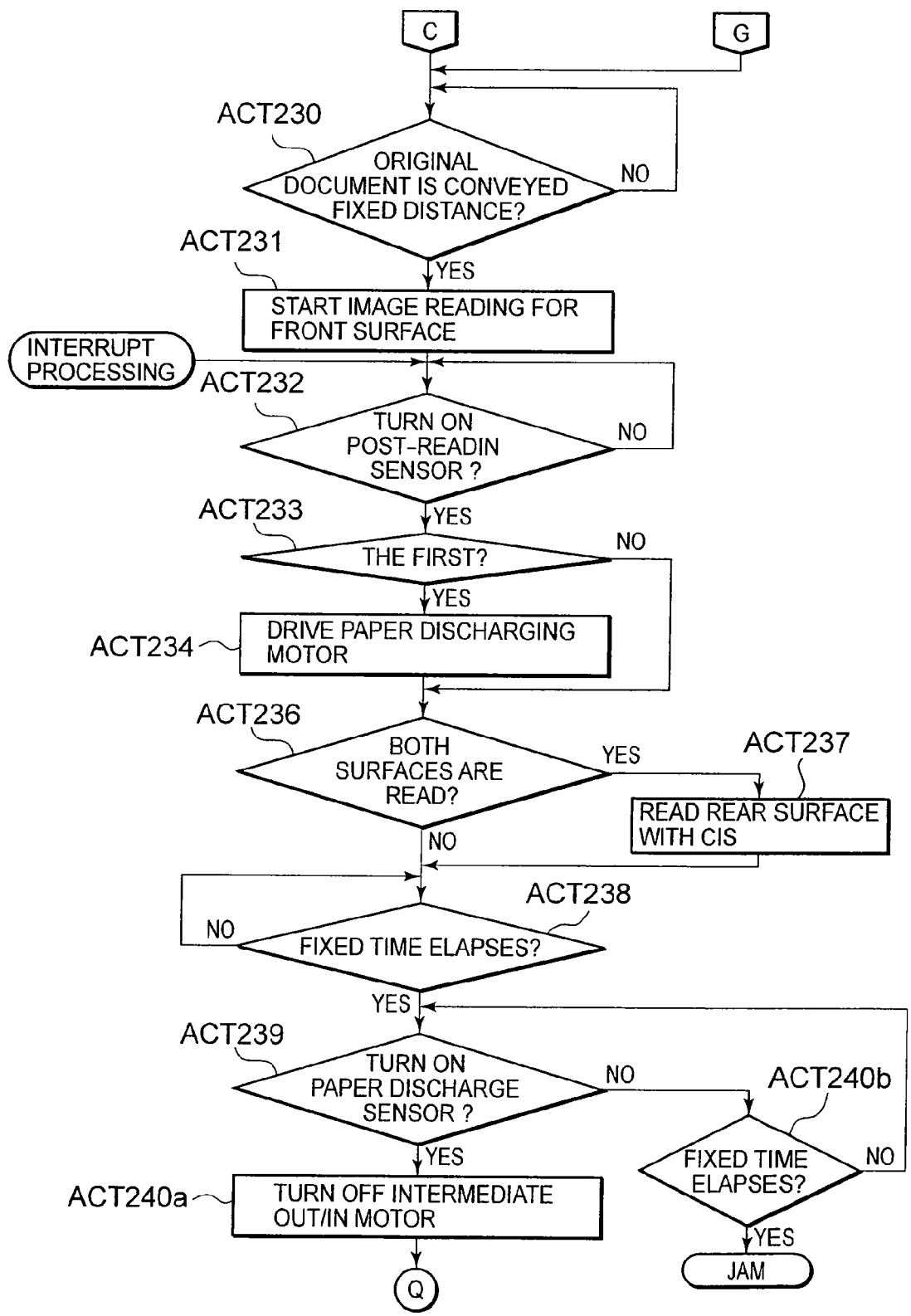
FIG. 7 is a flowchart for explaining processing from a start of reading of an image to stop of intermediate OUT/IN motor according to the embodiment.
Figure 7A:
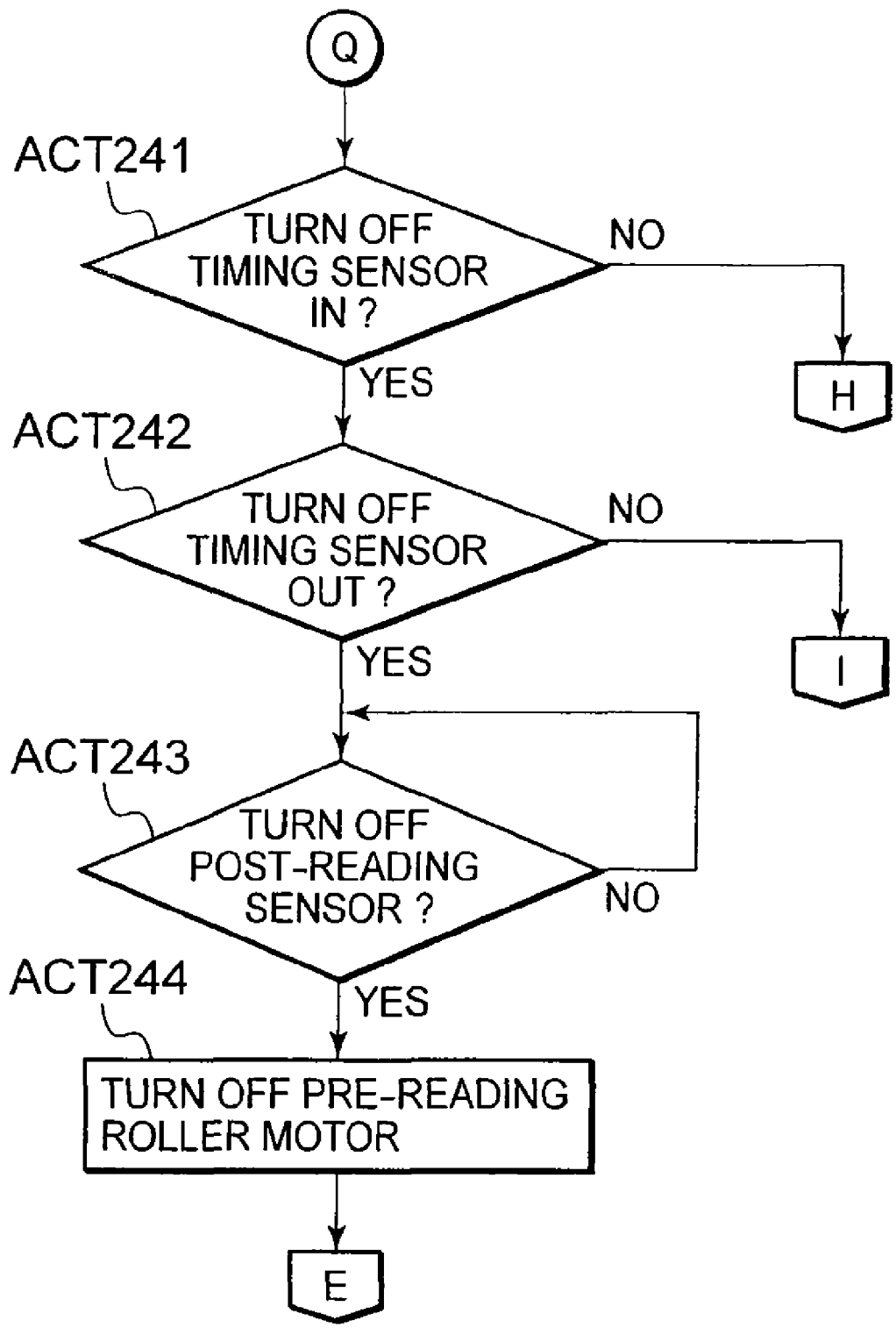
FIG. 7A is a flowchart for explaining processing from the stop of intermediate OUT/IN motor to stop of a pre-reading roller motor according to the embodiment.

A block diagram of a control system 120 mainly including the ADF 10 is shown in FIG. 3. The CCD 110d of the scanner 110 and the CIS 60 are connected to a main body control unit 121 that controls, for example, an entire image forming apparatus including the image reading apparatus 100. The main body control unit 121 controls a CPU 130 of the ADF 10 via an input and output interface 122. The empty sensor 70, the RGT sensor 71, the timing sensor OUT 72, the timing sensor IN 73, the pre-reading sensor 76, the post-reading sensor 77, and the paper discharge sensor 78 are connected to an input side of the CPU 130.

The pickup solenoid 81, the paper feeding motor 80, the RGT motor 82, the gate solenoid 83, the intermediate OUT motor 84, the intermediate IN motor 86, the READ motor 87, the paper discharge motor 88, the pre-reading roller motor 89 and the change mechanism 50c are connected to an output side of the CPU 130.

A conveying process of the ADF 10 is explained below with reference to flowcharts shown in FIGS. 4 to 9. The conveying process carries out a first conveyance mode. The first conveyance mode is a mode for alternately directing the original documents G to the OUT path 16 or the IN path 17 and continuously conveying the original documents G. In the first conveyance mode, the ADF 10 conveys a preceding original document and a following original document to the pre-reading roller 50 with overlap the trailing edge of the preceding original document and the leading edge of the following original document. After a power supply is turned on, in ACT 200, the CPU 130 confirms that the ADF 10 is closed on the platen glass 110b. In ACT 201, the CPU 130 detects all the sensors and confirms that no paper jam occurs in the ADF 10. In ACT 202, when the original document G is placed on the document tray 11, the empty sensor 70 is turned on and transmits a document ON signal to the main body control unit 121. In ACT 203, when a paper feed request signal is received from the main body control unit 121, the CPU 130 installs a reading mode in ACT 204 and proceeds to ACT 206. When installs a both reading mode, the CPU 130 turns on the CIS 60 as the second image reading unit and makes the CIS 60 possible to read the original documents in ACT 205 and proceeds to ACT 206.

Figure 10:
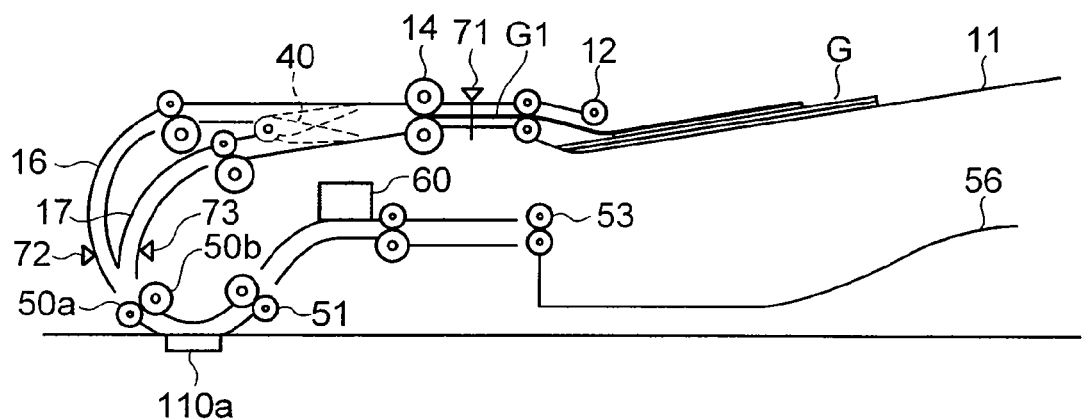
FIG. 10 is an explanatory diagram of the start of feeding of a first original document according to the embodiment.

In ACT 206, the CPU 130 turns on the pickup solenoid 81, turns on the paper feeding motor 80 to rotate the pickup roller 12 and the separation and paper feeding rollers 13, and starts paper feeding operation for a first original document G1. When the RGT sensor 71 is turned on in ACT 207, after conveying the original document G1 for a fixed time, the CPU 130 turns off the post-paper feeding motor 80 and turns off the gate solenoid 83 (ACT 208). As shown in FIG. 10, the first original document G1 contact with the RGT rollers 14 and stops with a leading edge position thereof aligned. The gate 40 is set in a direction in which the first original document G1 is directed to the OUT path 16. When the RGT sensor 71 is not turned on even when a fixed time elapses in ACT 210, the CPU 130 determines that the original document G1 causes a paper jam.

After the RGT sensor 71 is turned on in ACT 207, separately from the conveying process for the first original document G1, the CPU 130 starts a paper feeding process for a second original document G2 as interrupt processing. The second original document G2 is put on standby for the paper feeding process until the trailing edge of the first original document G1 finishes passing through the RGT sensor 71. After the RGT sensor 71 changes from ON to OFF in ACT 300 (Yes in ACT 300), the CPU 130 proceeds to ACT 302. In case of the original document G is an odd-numbered original document in ACT 302 (Yes in ACT 302), the CPU 130 proceeds to ACT 303. When adjustment time T2 for passage through the IN path 17 elapses in ACT 303 (Yes in ACT 303), the CPU 130 proceeds to ACT 206. In case of the original document G is an even-numbered original document in ACT 302 (No in ACT 302), the CPU 130 proceeds to ACT 304. When adjustment time T1 for passage through the OUT path 16 elapses in ACT 304 (Yes in ACT 304), the CPU 130 proceeds to ACT 206. Incase of the RGT sensor 71 does not change from ON to OFF even when a fixed time elapses in ACT 301, the CPU 130 determines that the original document G1 causes a paper jam.

The adjustment times are set in a memory 130a of the CPU 130 in advance. The adjustment times determine an overlap amount of the trailing edge of a preceding original document and the leading edge of a following original document in the common conveying unit 20 of the OUT path 16 and the IN path 17. For example, the adjustment times for the OUT path 16 and the IN path 17 are set to determine as an initial value, for the overlap amount will be L1. The adjustment time for passage through the OUT path 16 is set as T1 and the adjustment time for passage through the IN path 17 is set as T2. The adjustment times can be adjusted according to a paper quality of an original document or a necessary overlap amount.

For example, the CPU 130 adjusts the adjustment times by respectively measuring slip amounts of original documents passing through the OUT path 16 and the IN path 17. The CPU 130 sets, for each type or size of the original document, a slip amount of the original passing through the OUT path 16 when the adjustment time is set to T1 as an initial value. The CPU 130 sets, for each type or size of the original document, a slip amount of the original document passing through the IN path 17 when the adjustment time is set to T2 as an initial value. The CPU 130 converts the slip amounts of the original document at the initial time into initial conveyance time for the original documents from the RGT sensor 71 to the timing sensor OUT 72 or from the RGT sensor 71 to the timing sensor IN 73 and stores the conveyance time in the memory 130a.

At a time which the original documents are conveyed in the ADF 10, the CPU 130 measures conveyance time for the original document passing through the OUT path 16, from the RGT sensor 71 to the timing sensor OUT 72. The CPU 130 compares the initial conveyance time stored in the memory 130a and the measured time.

As a result of the comparison, in case of the slip amount of the original document in the OUT path 16 is large and the measured time is longer than the initial conveyance time, the CPU 130 sets the adjustment time in ACT 304 to be shorter than T1. Even when the original document passing through the OUT path 16 slips, and the conveyance time is extended, the CPU 130 adjusts time when the original document reaches to the timing sensor OUT 72 to be fixed, with quick the draw timing of the original document by the pickup roller 12. As a result of the comparison, when the slip amount of the original document in the OUT path 16 is small and the measured time is shorter than the initial conveyance time, the CPU 130 sets the adjustment time in ACT 304 to be longer than T1 and delays the drawing of a sheet by the pickup roller 12. The CPU 130 adjusts time when the original document reaches the timing sensor OUT 72 to be fixed.

As a result of the comparison, when the slip amount of the original document in the IN path 17 is large and the measured time is longer than the initial conveyance time, the CPU 130 sets the adjustment time in ACT 303 to be shorter than T2. Even when the original document passing through the IN path 17 slips, and the conveyance time is extended, the CPU 130 adjusts time when the original document reaches to the timing sensor IN 73 to be fixed, with quick the draw timing of the original document by the pickup roller 12. As a result of the comparison, when the slip amount of the original document in the IN path 17 is small and the measured time is shorter than the initial conveyance time, the CPU 130 sets the adjustment time in ACT 303 to be longer than T2 and delays the drawing of a sheet by the pickup roller 12. The CPU 130 adjusts time when the original document reaches the timing sensor IN 73 to be fixed.

By adjusting the adjustment times in ACT 303 and ACT 304, the CPU 130 fixes time when the original document passing through the OUT path 16 reaches to the timing sensor OUT 72 or time when the original document passing through the IN path 17 reaches to the timing sensor IN 73, and fixes an overlap amount of original documents in the common conveying unit 20 of the OUT path 16 and the IN path 17. Consequently, the CPU 130 surely prevents the overlap amount of the original documents from deviating to cause collision and interference of the ends of the original documents and surely prevent damages to the ends of the original documents.

Figure 11:
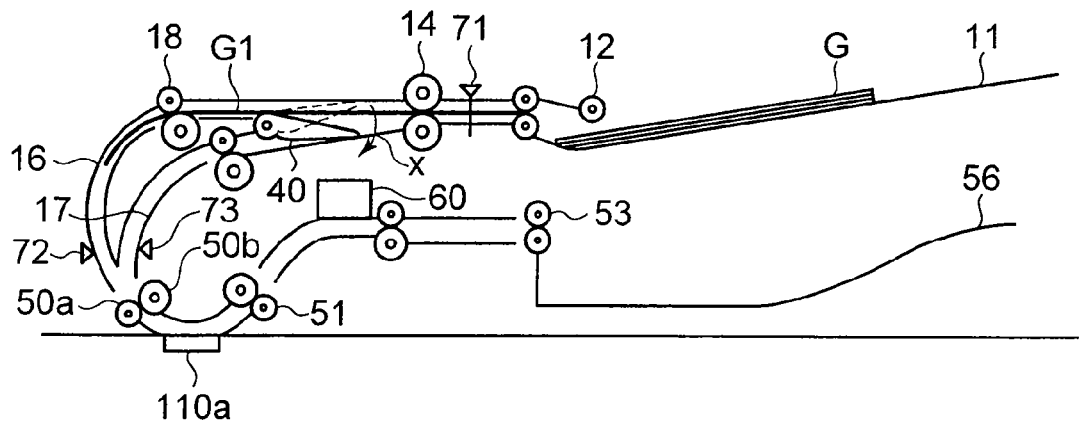
FIG. 11 is an explanatory diagram of conveyance of the first original document to the OUT conveying unit according to the embodiment.

The CPU 130 turns on the RGT motor 82 and the intermediate OUT motor 84 to rotate the RGT rollers 14 and the intermediate OUT roller 18 (ACT 214) because of the fixed time elapses in ACT 211 and the original document G1 is the odd-numbered original document (Yes in ACT 212). The CPU 130 adjusts the rotation speed of the intermediate OUT roller 18 to the rotation speed of the RGT rollers 14 and rotates the RGT rollers 14 and the intermediate OUT roller 18 at equal speed. As shown in FIG. 11, the first original document G1 is directed to the gate 40 and travels to the OUT path 16.

Figure 12:
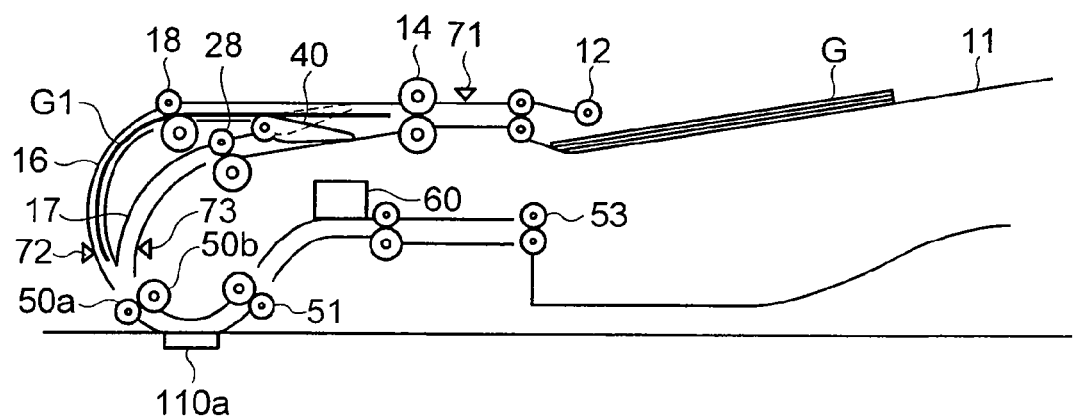
FIG. 12 is an explanatory diagram of standby in the OUT conveying unit of the first original document according to the embodiment.

At the time the timing sensor OUT 72 is turned on by the original document G1 (Yes in ACT 215), the CPU 130 drives the RGT motor 82 and the intermediate OUT motor 84 with a fixed number of pulses and stops (ACT 216). As shown in FIG. 12, the first original document G1 stops before the pre-reading roller 50. When the timing sensor OUT 72 does not turn on even when the fixed time elapses in ACT 217, the CPU 130 determines that the original document G1 causes a paper jam.

In ACT 218, when the CPU 130 receives a conveyance request signal from the main body control unit 121 (Yes in ACT 218), the CPU 130 proceeds to ACT 219. In ACT 219, the main body control unit 121 determines the scanner 110 can read the original document G1, when the original document G1 is the first document and the pre-reading sensor 76 is turned off and proceeds to ACT 221.

In ACT 221, the CPU 130 turns on the intermediate OUT motor 84 to rotate the intermediate OUT roller 18 and rotates the pre-reading roller 50 (the second roller 50b) through the intermediation of the change mechanism 50c. The CPU 130 controls the intermediate OUT roller 18 and the second roller 50b) at conveying speed requested by the main body control unit 121 and proceeds to ACT 223. The CPU 130 proceeds to ACT 226, when the pre-reading sensor 76 detects a leading edge of the first original document G1 (Yes in ACT 223). In ACT 226, the CPU 130 turns on the READ motor 87 to rotate the post-reading roller 51 and the pre-paper discharge roller 52.

Figure 19:
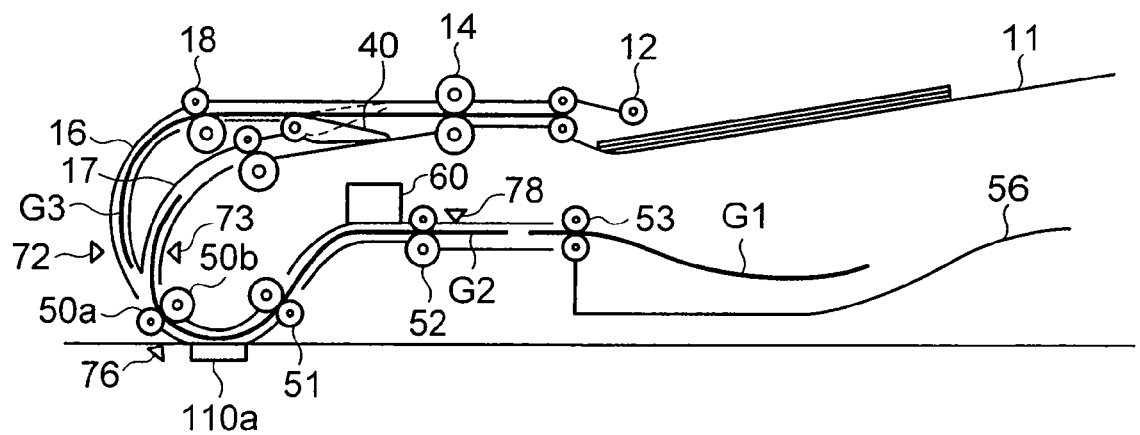
FIG. 19 is an explanatory diagram of conveyance of the third original document to the OUT conveying unit according to the embodiment.

At the same time when the original document G1 is an odd numbered original document except for the first original document G1 (No in ACT 219), the pre-reading sensor 76 is turned on with the preceding second original document G2 at the time of conveyance of the third original document G3 for example as shown in FIG. 19. In this instance in Act 220 the main body control unit 121 makes a conveyance request signal of the third original document G3 that is waiting to enable when past a given time (Yes in ACT 220), because the preceding second original document G2 is in reading process.

In ACT 222, the CPU 130 turns on the intermediate OUT motor 84 to rotate the intermediate OUT roller 18 and rotates the pre-reading roller 50 (the second roller 50b) through the intermediation of the change mechanism 50c and proceeds to ACT 224.

When the pre-reading sensor 76 detects a trailing edge of the preceding original document G (the pre-reading sensor 76 OFF) and detects a leading edge of the following original document G (the pre-reading sensor 76 ON) (Yes in ACT 224), the CPU 130 proceeds to ACT 227. When the pre-reading sensor 76 is not turned off even when the fixed time elapses (Yes in ACT 225), the main body control unit 121 (the CPU 130) determines that the preceding original document G2 causes a paper jam. The CPU 130 drives the READ motor 87, which is conveying the preceding original document G continuously in ACT 227 and proceeds to ACT 230.

The pre-reading roller motor 89 rotates the second roller 50b in an arrow n direction as a driving roller via the change mechanism 50c, when there is a preceding even-numbered original document G (No in ACT 219) in ACT 222. The first roller 50a performs as a separating roller by the idling torque of the first spring 58a.

The CPU 130 causes timing when the trailing edge of the preceding original document G passes through the pre-reading roller 50 and timing when the leading edge of the odd numbered original document G except for the first original document G1 starts to be conveyed by the pre-reading roller 50 to coincide with each other. Then the odd numbered original document except for the first original document G1 is conveyed to the READ document glass 110a in a state in which a distance between the trailing edge of preceding even-numbered original document G is nearly 0 mm.

When the first original document G1 is conveyed a fixed distance (Yes in ACT 230), the CPU 130 transmits a reading start signal to the main body control unit 121. The scanner 110 starts reading an image of a front surface of the original document G1 according to an instruction of the main body control unit 121 (ACT 231).

Figure 13:
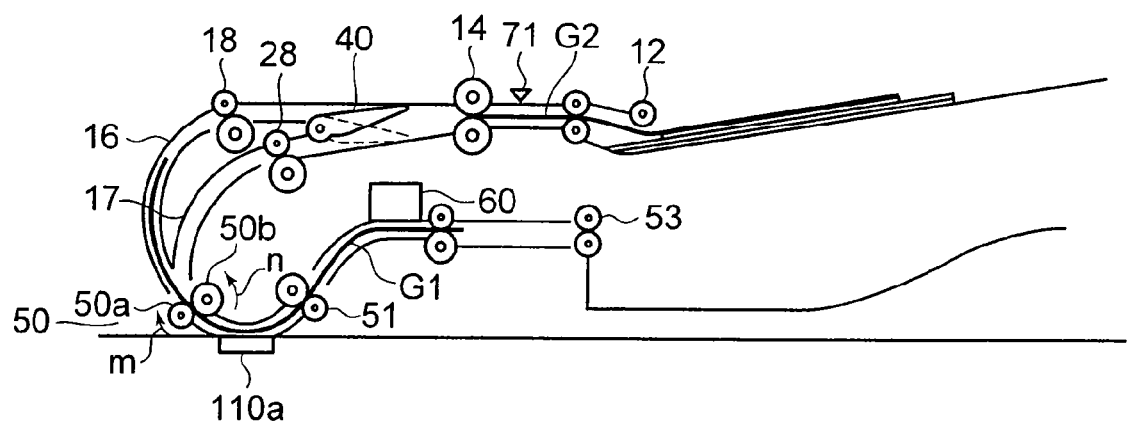
FIG. 13 is an explanatory diagram of the start of feeding of a second original document according to the embodiment.

In parallel, paper feeding of the second original document G2 is performed in ACT 206 through interrupt processing in ACT 300 to ACT 304. When the trailing edge of the first original document G1 finished passing through the RGT sensor 71 and the RGT sensor 71 changes from ON to OFF (Yes in ACT 300), as shown in FIG. 13, the first original document G1 travels on the READ document glass 110*a*. The scanner 110 performs image reading for the first original document G1. After being draw from the document tray 11 by the pickup roller 12 (ACT 206), the second original document G2 comes into contact with the RGT rollers 19 and stops with a leading edge position thereof aligned. (After being draw from the document tray 11, the second original document G2 turns on the RGT sensor 71 (ACT 207). The CPU 130 proceeds to ACT 212 through ACT 208 and ACT 211.)

Figure 14:
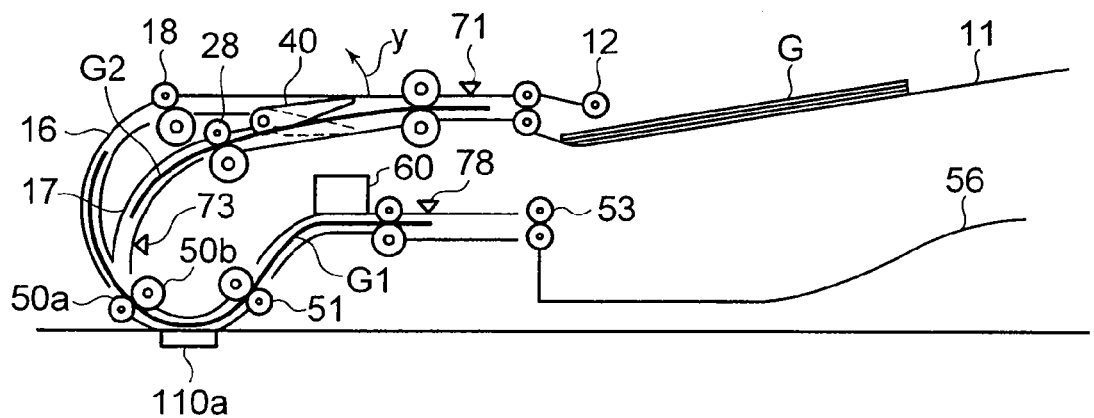
FIG. 14 is an explanatory diagram of conveyance of the second original document to the IN conveying unit according to the embodiment.

Because of the second original document G2 is an even-numbered original document (No in ACT 212), the CPU 130 proceeds to ACT 250. In ACT 250, the CPU 130 turns on the gate solenoid 83 and rotates the gate 40 in the arrow y direction to switch the gate 40 in a direction in which the second original document G2 is directed to the IN path 17 (as shown FIG. 14). In ACT 251, the CPU 130 turns on the ROT motor 82 and the intermediate IN motor 86 to rotate the RGT rollers 14 and the intermediate IN roller 28. The CPU 130 adjusts the rotation speed of the intermediate IN roller 28 to the rotation speed of the RGT rollers 14 and rotates the RGT rollers 14 and the intermediate IN roller 28 at equal speed. As shown in FIG. 14, the second original document G2 is directed by the gate 40 and travels to the IN path 17.

In ACT 231, the first original document G1 continues to travel on the READ document glass 110*a* and the scanner 110 continues the image reading for the first original document G1. The first original document G1 is conveyed in the direction of the paper discharge roller 53 through the post-reading roller 51 and the pre-discharge roller 52.

When the first original document G1 turns on the post-reading sensor 77 (Yes in ACT 232), the CPU 130 proceeds to ACT 234 in case that the original document G is the first (Yes in ACT 233). The CPU 130 turned on the paper discharge motor 88 for discharges the preceding original document in case that the original document G is the odd-numbered original document except for the first original document G1 or the even-numbered original document (No in ACT 233). Then the CPU 130 proceeds to ACT 236 in case (No in ACT 233).

The CPU 130 turns on the paper discharge motor 88 to rotate the paper discharge roller 53 in case that the original document is the first original document G1 in ACT 234. The CPU 130 proceeds to ACT 237 when the CPU 130 installs a both surfaces reading mode (Yes in ACT 236). The CPU 130 reads an image of a rear surface of the first original document G1 conveyed in a paper discharge direction with the CIS 60 in ACT 237. The CPU 130 proceeds to ACT 240*a* after a fixed time elapses after the first original document G1 turns on the post-reading sensor 77 (Yes in ACT 238) and the first original document G1 turns on (Yes in ACT 239).

In ACT 240*a*, the CPU 130 turns off the intermediate OUT motor 84 in case that the original document is the odd-numbered original document G, the CPU 130 turns off the intermediate IN motor 86 in case that the original document is the even-numbered original document G, and proceeds to ACT 241.

In case that the original document G does not turn on the paper discharge sensor 78 even when the fixed time elapses (Yes in ACT 240) when the paper discharge sensor 78 is off (No in ACT 239), the main body control unit 121 determines that the original document G causes a paper jam.

Figure 9:
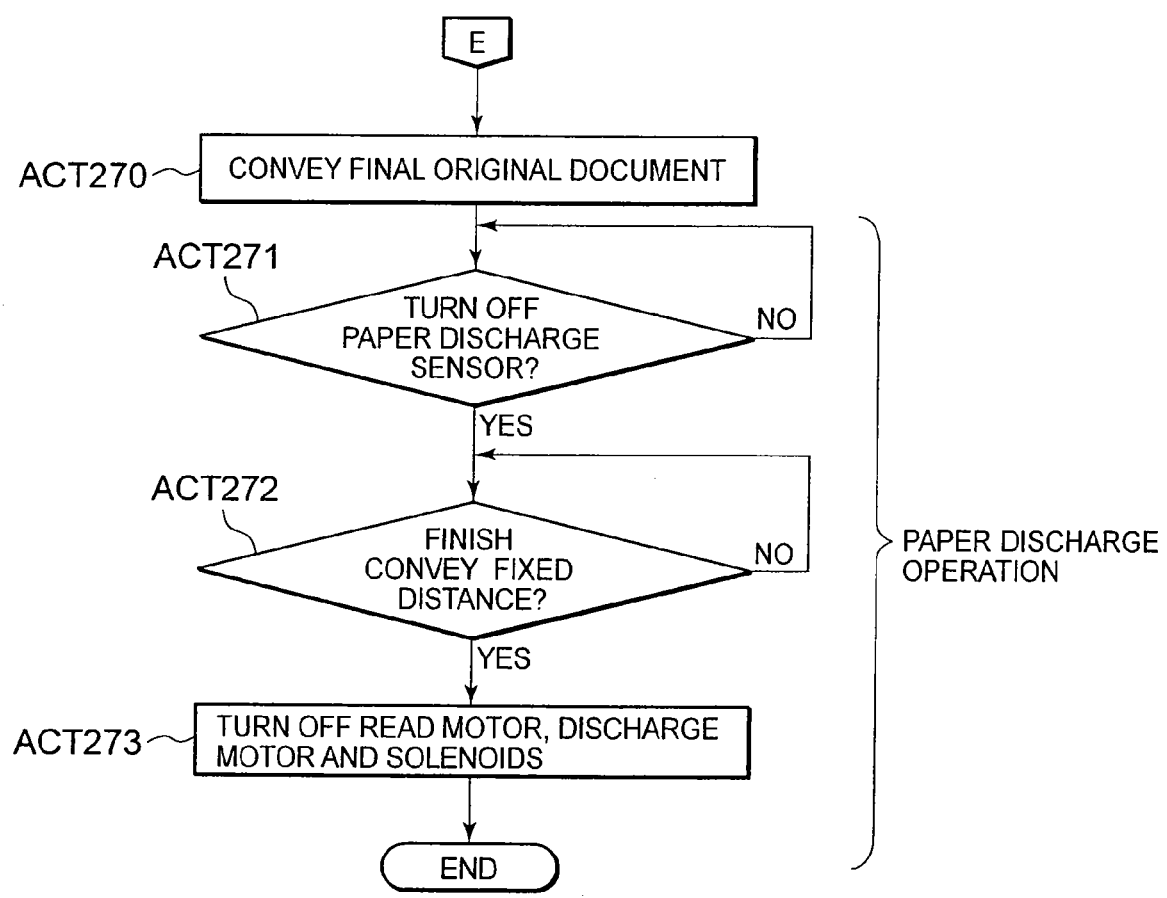
FIG. 9 is a flowchart for explaining the completion of conveyance according to the embodiment.

The CPU 130 discharges the first original document G1 on the paper discharge tray 56 by the paper discharge roller 53, after the CPU 130 finishes the image reading for the front surface or the both surfaces of the first original document G1. The main body control unit 121 (the CPU 130) determines that the original document is the final original document in case that the both of the timing sensor OUT 72 and the timing sensor IN 73 is turned off when the paper discharge sensor 78 is turned ON (Yes in ACT 241 and ACT 242). And CPU 130 turns off the pre-reading roller motor 89 in ACT 244 and proceeds to ACT 270 (as shown in FIG. 9) after the post-reading sensor 77 is turned off (Yes in ACT 243).

The CPU 130 continues a conveying operation of the following original document G during the following original document G stays in the OUT path 16 or the IN path 17 and either-or the timing sensor OUT 72 and the timing sensor IN 73 is turned on (either-or ACT 241 and ACT 242 is No). The CPU 130 repeats the conveyance of the original document G by the OUT path 16 and the conveyance of the original document G by the IN path 17 one after the other when the original document G is not a final original document, through the interrupt processing.

According to this embodiment, the CPU 130 turns off the pre-reading roller motor 89 in ACT 244, at the CPU 130 determines that the original document is the final original document. Although the CPU 130 may turn off all motors and solenoids in after mentioned ACT 273, after the CPU 130 finishes the discharging of the original document G.

In parallel, when the timing sensor IN 73 is turned on by the second original document G2 (the even-numbered original document G), in ACT 252, the CPU 130 drives the RGT motor 82 and the intermediate IN motor 86 with a fixed number of pulses and stops the RGT motor 82 and the intermediate IN motor 86 (ACT 253). The second original document G2 stops before the pre-reading roller 50. In case of the timing sensor IN 73 is not turned on even when a fixed time elapses in ACT 254, the CPU 130 determines that the second original document G2 causes a paper jam. When a conveyance request signal for the second original document G2 is received from the main body control unit 121 in ACT 255 (Yes in ACT 255), the CPU 130 proceeds to ACT 256.

The CPU 130 proceed to ACT 257, when a predetermined time elapses after the leading edge of the preceding original document G (the first original document G1 or the odd-numbered original document G) turns on the pre-reading sensor 76 (Yes in ACT 256). The CPU 130 turns on the intermediate IN motor 86 to rotate the intermediate IN roller 28 and rotates the pre-reading roller 50 via the change mechanism 50*c* in ACT 257. The intermediate IN roller 28 and the pre-reading roller 50 conveys the second original document G2 (the even-numbered original document G) at conveying speed requested by the main body control unit 121. And the CPU 130 proceeds to ACT 258.

In ACT 257, the change mechanism 50*c* changes a driving motion and a following motion of the first roller 50*a* and the second roller 50*b* of the pre-reading roller 50. The change mechanism 50*c* rotates the first roller 50*a* in the arrow m direction as a driving roller and sets the second roller 50*b* free. Until the leading edge of the second original document G2 reaches the pre-reading roller 50, the second roller 50b rotates in the arrow n direction following the original document G1 passing through the pre-reading roller 50.

The CPU 130 proceeds to ACT 260 after the pre-reading sensor 76 detects the trailing edge of the original document G (the first original document G1 or the odd-numbered original document G) (the pre-reading sensor 76 OFF) and detects a leading edge of the second original document G2 (the pre-reading sensor 76 ON) (Yes in ACT 258). The CPU 130 proceeds to ACT 230 during the CPU 130 drives the READ motor 87 continuously in ACT 260. In case of the pre-reading sensor 76 is not turned on even when a fixed time elapses in ACT 259 (Yes in ACT 259), the main body control unit 121 determines that the original document G causes a paper jam.

Figure 15:
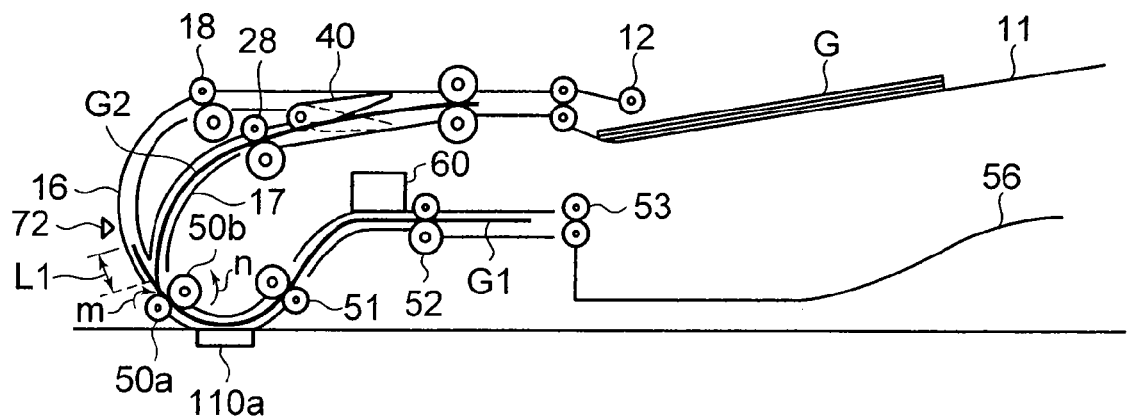
FIG. 15 is an explanatory diagram of overlap of conveyance of the first and second original documents according to the embodiment.

As shown in FIG. 15, after finishing passing through the second conveying path 17a, the leading edge of the following original document (the second original document G2 or the even-numbered original document G) overlaps the trailing edge of the preceding original document (the first original document G1) by the overlap amount L1. When the preceding original document and the following original document flow together, since the trailing edge of the preceding original document and the leading edge of the following original document does not collide with each other, it is possible to prevent the ends of the documents from being damaged.

When the overlapping portion of the trailing edge of the first original document G1 and the leading edge of the second original document G2 reaches the pre-reading roller 50, the pre-reading roller 50 performs operation for separating the original documents by idling torque of the second spring 58b.

When the overlapping portion of the trailing edge of the odd-numbered original document G and the leading edge of the even-numbered original document G reaches the pre-reading roller 50, the pre-reading roller 50 performs separating unit.

When the overlapping portion reaches the pre-reading roller 50, the trailing edge of the first original document G1 continues to be conveyed by the first roller 50a. Double-feed of the second original document G2 is prevented by the second roller 50b. When the trailing edge of the first original document G1 (odd-numbered original document G) finished passing the position of the pre-reading roller 50, the second original document G2 (the even-numbered original document G) is conveyed in the direction of the READ glass 110a by the first roller 50a driven to rotate in the arrow m direction.

Figure 16:
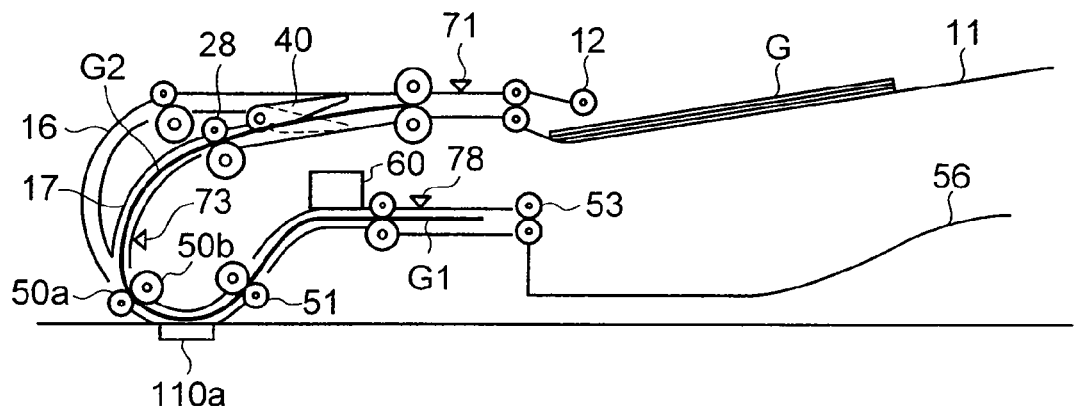
FIG. 16 is an explanatory diagram of separation of the first and second original documents according to the embodiment.
Figure 17:
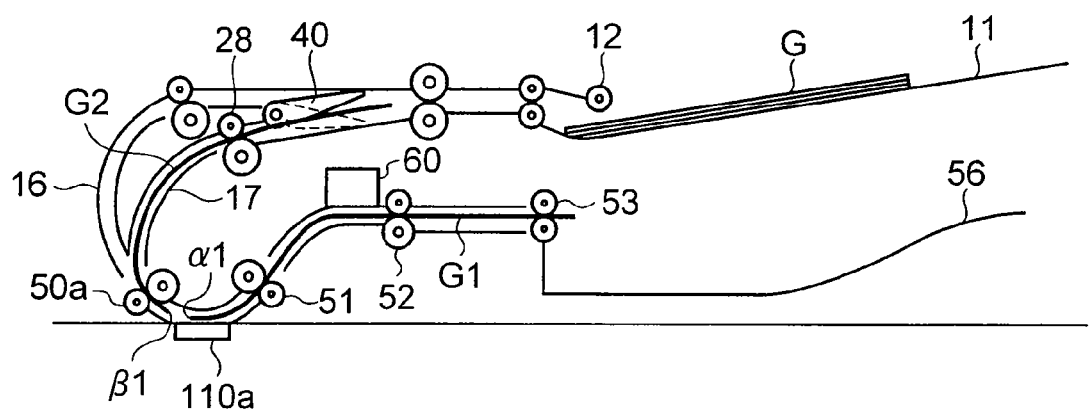
FIG. 17 is an explanatory diagram of conveyance of the second original document by the pre-reading roller according to the embodiment.

As shown in FIG. 16, the pre-reading roller 50 separates the overlap of the trailing edge of the first original document G1 and the loading end of the second original document G2. As shown in FIG. 17, the second original document G2 is conveyed in the direction of the READ glass 110a by the pre-reading roller 50. The second original document G2 can be supplied in the direction of the READ glass 110a with a distance between a leading edge $\beta 1$ of the second original document G2 and a trailing edge $\alpha 1$ of the first original document G1 reduced to nearly 0 mm. An increase in image reading speed on the READ glass 110a can be realized.

The original document G conveyed to the pre-reading roller 50 passing through the OUT path 16 and the original document G conveyed to the pre-reading roller 50 passing through the IN path 17 pass through the first conveying unit 16b or the second conveying unit 17b adjacent to each other on an upstream side of the pre-reading roller 50. The first conveying unit 16b and the second conveying unit 17b are the common conveying unit 20. When the original document G passes through the first conveying unit 16b or the second conveying unit 17b, the curling of the original document G that occurs in the first conveying path 16a or the second conveying path 17a. The leading edge of the original document G finishes passing through the pre-reading roller 50 is eliminated lift on the READ document glass 110a, caused by the curling and a stable image quality can be obtained.

Conditions for passage of the original document G are different between when the original document G passes through the OUT path 16 and when the original document G passes through the IN path 17. However, both the original documents G passing through the OUT path 16 and the IN path 17 are conveyed to the pre-reading roller 50 through the common conveying unit 20 having length of 30 mm. Both the original documents G passing through the OUT path 16 and the IN path 17 are led into the pre-reading roller 50 at the same angle. Therefore, a draw-out load applied to the original document G when the original document G passes through the pre-reading roller 50 is the same irrespective of which of the OUT path 16 and the IN path 17 the original document G passes through. As a result, a slip amount of the original document G conveyed on the READ glass 110a is the same and a stable image quality is obtained irrespective of which of the OUT path 16 and the IN path 17 the original document G passes.

Figure 18:
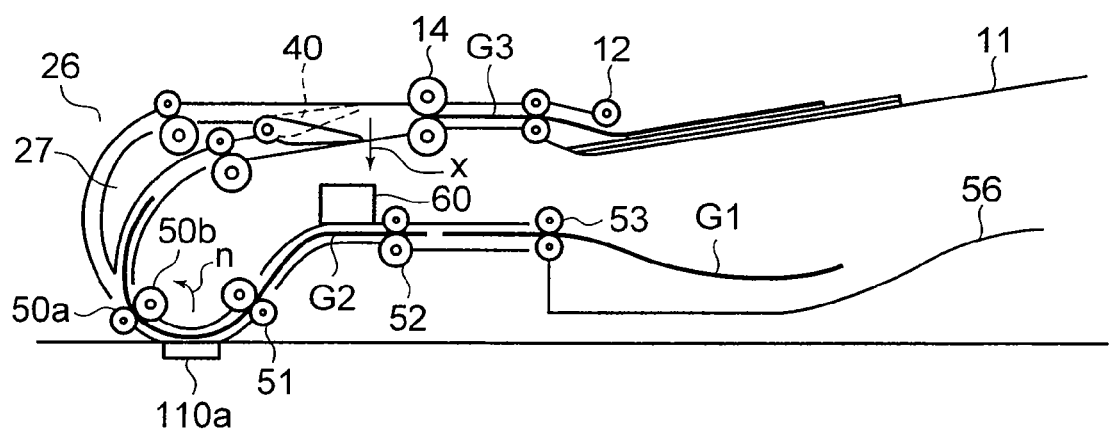
FIG. 18 is an explanatory diagram of the start of feeding of a third original document according to the embodiment.

After the second original document G2 conveyed to the READ document glass 110a in ACT 260 is conveyed a fixed distance (ACT 230), the CPU 130 starts image reading for the front surface of the original document G2 with the scanner 110 (ACT 231). When the trailing edge of the second original document G2 finishes passing through the RGT sensor 71 and the RGT sensor 71 changes from ON to OFF, in parallel, interrupt processing for paper feeding of a third original document G3 is started. As shown in FIG. 18, the first original document G1 is discharged in the direction of the paper discharge tray 56 by the paper discharge roller 53. The second original document G2 travels on the READ document glass 110a. The third original document G3 comes into contact with the RGT rollers 14 and stops with a leading edge position thereof aligned.

When the trailing edge of the second original document G2 finishes passing through the RGT sensor 71 and the RGT sensor 71 changes from ON to OFF (Yes in ACT 300) and when the adjustment time in ACT 304 elapses, the CPU 130 proceeds to ACT 206. After being draw from the document tray 11 by the pickup roller 12 (ACT 206), the third original document G3 comes into contact with the RGT rollers 14 and stops with a leading edge position aligned. (After being draw from the document tray 11, the third original document G3 turns on the RGT sensor 71 (ACT 207). The CPU 130 proceeds to ACT 212 through ACT 208 and ACT 211).

In ACT 212, because of the third original document G3 is the odd-numbered original document (Yes in ACT 212), the CPU 130 proceeds to ACT 214. In ACT 208, the CPU 130 turns off the gate solenoid 83 and rotates the gate 40 in the arrow x direction to switch the gate 40 to a direction in which the third original document G3 is directed to the OUT path 16. In ACT 214, the CPU 130 rotates the RGT rollers 14 and the intermediate OUT roller 18 to convey the third original document G3 to the OUT path 16. As shown in FIG. 19, the first original document G1 is placed on the paper discharge tray 56. The second original document G2 travels on the READ document glass 110a and turns on the paper discharge sensor 78. The third original document G3 stops before the pre-reading roller 50 in the OUT path 16.

Thereafter, because of No in ACT 219, after a predetermined time elapses after the preceding original document G2 turns on the pre-reading sensor 76, the CPU 130 turns on the intermediate OUT motor 84 to rotate the intermediate OUT roller 18 and rotates the pre-reading roller 50b via the change mechanism 50c in ACT 222. The CPU 130 proceeds to ACT 224. The CPU 130 proceeds to ACT 227 after the pre-reading sensor 76 detects the trailing edge of the second original document G2 and detects a leading edge of the third original document G3 (Yes in ACT 224). In case of the pre-reading sensor 76 is not turned on even when a fixed time elapses in ACT 224 (Yes in ACT 225), the main body control unit 121 (the CPU 130) determines that the original document G causes a paper jam.

The CPU 130 rotates the intermediate OUT roller 18, the pre-reading roller 50 and the pre-paper discharge roller 52 continuously at speed conforming to an instruction of the main body control unit 121 in ACT 227, when the image reading apparatus 100 conveys the third original document G3. In ACT 222, the change mechanism 50c changes the driving motion and the following motion of the first roller 50a and the second roller 50b of the pre-reading roller 50. The change mechanism 50c drives to rotate the second roller 50b in the arrow n direction and sets the first roller 50a free. The pre-reading roller 50 performs operation for separating an overlapping portion of the second original document G2 and the third original document G3. After conveying the trailing edge of the second original document G2, the pre-reading roller 50 conveys the third original document G3 in the direction of the READ glass 110a.

Figure 20:
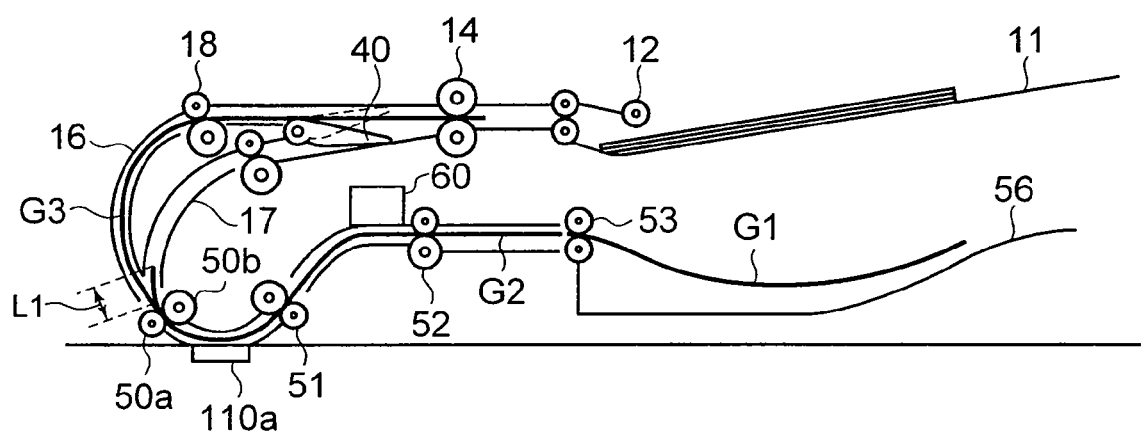
FIG. 20 is an explanatory diagram of overlap of conveyance of the second and third original documents according to the embodiment.

As described above the pre-reading roller 50 separates the overlap of the trailing edge of the second original document G2 and the leading edge of the third original document G3. When the third original document G3 is conveyed in the direction of the READ glass 110a, a distance between the trailing edge of the second original document G2 and the leading edge of the third original document G3 is nearly 0 mm. As shown in FIG. 20, after finishing passing through the first conveying path 16a, the leading edge of the following third original document G3 overlaps the trailing edge of the preceding second original document G2 with the overlap amount L1. When the preceding original document and the following original document flow together, since the trailing edge of the preceding original document and the leading edge of the following original document does not collide with each other, it is possible to prevent the documents from being damaged. The CPU 130 repeats the conveying of the odd numbered original document G more than the third original document G3 along the flowcharts above-mentioned.

The CPU 130 turns off the paper discharge sensor 78 after the trailing edge of the original document G passes through the pre-discharge roller 52 (Yes ACT 271), when the original document G is the final original document. The CPU 130 conveys the final original document G in a fixed distance by the paper discharge roller 53 (Yes ACT 272), and turns off the READ motor 87, the paper discharge motor 88 and solenoids in ACT 273, when the original document G is the final original document. The CPU 130 finishes the original document conveyance by the ADF 10.

According to this embodiment, the CPU 130 changes the driving of the first roller 50a and the second roller 50b with a change mechanism 50c of the pre-reading roller motor 89. Although a drive-transmitter of a READ motor 87 may be provided a change mechanism. The CPU 130 operates the change mechanism in ACT 221, 222 and 257 above mentioned. The CPU 130 may change operation of the READ motor and operate a separating.

In case of the ADF 10 conveys an original document having thickness equal to or larger than a predetermined value, the ADF 10 carries out the conveyance of the original document in a second conveyance mode. In the second conveyance mode, the ADF 10 conveys, without using both the OUT path 16 and the IN path 17, the original document G using only the OUT path 16 in which a radius of the first conveying path 16a is large compared with a radius of the second conveying path 17a.

For example, in case of the original document G is a postcard, an envelope, or the like and the thickness of the original document G detected by the ultrasonic sensor 74 is larger than the predetermined value, the CPU 130 maintains the gate solenoid 83 in an OFF state. The CPU 130 maintains the pivoting in the arrow x direction of the gate 40 and always directs the original document G to the OUT path 16 side. In case of the original document G is thick, the CPU 130 can reduce a load applied to the original document G in the path by causing the original document G to pass through the OUT path 16 having a larger radius. In particular, even when there is a step or the like in the path, it is unlikely that an original document is jammed by the step to cause a paper jam. Therefore, more satisfactory conveyability is obtained. The second conveyance mode may be not only set according to a measurement result of the ultrasonic sensor or the like but also input from a control panel or the like and set. An original document conveyed in the second conveyance mode is not limited to a thick original document. For example, in the case of an original document having high rigidity, a load applied to the original document during conveyance can be reduced by conveying the original document in the second conveyance mode. Therefore, more satisfactory conveyability is obtained.

According to this embodiment, in case of the original documents G are continuously read in the first conveyance mode, both the OUT path 16 and the IN path 17 are alternately used. When the original documents G that finish passing through the OUT path 16 and the IN path 17 flow together, the trailing edge of the preceding original document and the leading edge of the following original document are caused to overlap. This makes it possible to prevent, when the original documents passing through the paths flow together, the ends of the original documents from colliding with each other to damage the original documents. After the original documents G that finish passing through the OUT path 16 and the IN path 17 merge, the pre-reading roller 50 separates the original documents G. The preceding original document and the following original document can be continuously conveyed with a space between the original documents reduced to nearly 0 mm. Even when the conveyance speed of the original documents G is not increased, conveyability of the original documents G by the ADF 10 can be improved and image reading speed by the scanner 110 and productivity of the image forming apparatus employing the scanner 110 can be improved. Moreover, damages to the original documents G that occur when the conveyance speed is increased can be prevented.

Timing for conveyance of an original document during passage through the OUT path 16 or the IN path 17 is adjusted according to a slip amount of the original document in the OUT path 16 or the IN path 17. An overlap amount during flow together of original documents is maintained constant irrespective of fluctuation in slip amounts of the original documents in the OUT path 16 and the IN path 17. The overlap amount of the original documents during flow together is surely prevented from fluctuation to cause interference of the ends of the original documents. The ends of the original documents are surely prevented from being damaged.

The common conveying unit 20 is provided in the OUT path 16 and the IN path 17. An angle for leading an original document into the pre-reading roller 50 is the same irrespective of which of the OUT path 16 and the IN path 17 the original document passes through. A slip amount of an original document conveyed on the READ glass 110a is the same and a stable image quality is obtained irrespective of which of the OUT path 16 and the IN path 17 the original document passes.

According to this embodiment, when the thickness of an original document is equal to or larger than the predetermined thickness, the original document is conveyed by using only the OUT path 16 including the first conveying path 16a having the large radius. Therefore, it is possible to reduce a load applied to the original document during conveyance and obtain more satisfactory conveyability.

The present invention is not limited to the embodiment and can be variously modified within the scope of the present invention. For example, the shape, the size, and the like of the conveying paths are not limited. An overlap amount of the preceding original document and the following original document is not limited. The overlap amount is ability when the conveyance of an original document passing through the first conveying path and conveyance of an original document passing through the second conveying path shift from each other more or less, as long as overlap remains and the ends of the original document do not interfere with each other. Further, the structure of the image reading units that read original documents is arbitrary. In the embodiment, for a further reduction in size of the apparatus, a small CIS may be used instead of the scanner that reads the surface of the original document.

What is claimed is:

1. An auto document feeding device comprising:
a first conveying path configured to reach from a document placing unit to a first image reading unit, the first conveying path including a first reversing unit formed in an arc shape, the first conveying path being an OUT path including the first reversing unit,
a second conveying path configured to reach from the document placing unit to the first image reading unit and have a path different from the first conveying path, the second conveying path having a second reversing unit formed in an arc shape, the second conveying path being an IN path including the second reversing unit having a radius smaller than a radius of the first reversing unit;
a gate unit configured to direct original documents, which are sent from the document placing unit, to either the first conveying path or the second conveying path, the gate directing the original document to the OUT path when the original document has a thickness equal to or larger than a fixed thickness;
a document conveying unit includes a first conveyance mode which conveying the original documents with overlap a trailing edge of a preceding original document and a leading edge of a following original document, when the gate unit alternately directs the original documents from the document placing unit to the first conveying path or the second conveying path; and
a separating unit configured to separate the overlap of the trailing edge of the preceding original document and the leading edge of the following original document before the leading edge of the following original document reaches the first image reading unit.

2. The device according to claim 1, wherein
the separating unit includes a first roller and a second roller that rotate following each other, and
the first roller and the second roller switch driving rotation for conveying the original document to the first image reading unit and the following rotation.

3. The device according to claim 1, wherein adjusting the first conveying mode is in accordance with a slip of the original document in the first conveying path or the second conveying path.

4. The device according to claim 3, wherein adjusting the first conveyance mode on the first conveying path side is with measuring a slip of the original document passing through the first conveying path, or adjusting the first conveyance mode on the second conveying path side is with measuring a slip of the original document passing through the second conveying path.

5. The device according to claim 4, wherein, an adjustment of the first conveyance mode on the first conveying path side or the first conveyance mode on the second conveying path side is changing a timing for draw of the original document from the document placing unit.

6. The device according to claim 1, wherein
the first conveying path and the second conveying path include a common conveying unit that reaches from the first reversing unit and the second reversing unit to the separating unit.

7. An image reading apparatus comprising:
a first image reading unit configured to read an image of a first surface of a traveling original document;
a first conveying path configured to reach from a document placing unit to the first image reading unit, the first conveying path including a first reversing unit formed in an arc shape, the first conveying path being an OUT path including the first reversing unit;
a second conveying path configured to reach from the document placing unit to the first image reading unit and have a path different from the first conveying path, the second conveying path having a second reversing unit formed in an arc shape, the second conveying path being an IN path including the second reversing unit having a radius smaller than a radius of the first reversing unit;
a gate unit configured to direct original documents, which are sent from the document placing unit, to either the first conveying path or the second conveying path, the gate directing the original document to the OUT path when the original document has a thickness equal to or larger than a fixed thickness;
a document conveying unit includes a first conveyance mode which conveying the original documents with overlap a trailing edge of a preceding original document and a leading edge of a following original document, when the gate unit alternately directs the original documents from the document placing unit, to the first conveying path or the second conveying path;
a separating unit configured to separate the overlap of the trailing edge of the preceding original document and the leading edge of the following original document before the leading edge of the following original document reaches the first image reading unit; and
a paper discharging unit configured to discharge the original document that finishes passing through the first image reading unit.

8. The apparatus according to claim 7, wherein
the separating unit includes a first roller and a second roller that rotate following each other, and
the first roller and the second roller switch driving rotation for conveying the original document to the first image reading unit and the following rotation.

9. The apparatus according to claim 7, wherein adjusting the first conveyance mode is in accordance with a slip of the original document in the first conveying path or the second conveying path.

10. The apparatus according to claim 9, wherein adjusting the first conveyance mode on the first conveying path side is with measuring a slip of the original document passing through the first conveying path, or adjusting the first conveyance mode on the second conveying path side is with measuring a slip of the original document passing through the second conveying path.

11. The apparatus according to claim 10, wherein, an adjustment of the first conveyance mode on the first conveying path side or the first conveyance mode on the second conveying path side is changing a timing for draw of the original document from the document placing unit.

12. The apparatus according to claim 7, wherein
the first conveying path and the second conveying path include a common conveying unit that reaches from the first reversing unit and the second reversing unit to the separating unit.

13. The apparatus according to claim 7, further comprising a second image reading unit configured to read an image of a second surface of the original document along the paper discharging unit.

14. An auto document feeding method comprising:
directing original documents, which are sent from a document placing unit, to plural conveying paths;
directing, when the original document sent from the document placing unit has a thickness equal to or larger than a fixed thickness, the original document to any one conveying path having a larger radius of a reversing unit among the plural conveying paths;
conveying a preceding original document and a following original document, which are directed to the plural conveying paths, in a direction of, a first image reading unit with overlap a trailing edge of a preceding original document and a leading edge of a following original document; and
separating the overlap of the trailing edge of the preceding original document and the leading edge of the following original document before the leading edge of the following original document reaches to the first image reading unit.

15. The method according to claim 14, further comprising adjusting, according to a conveyance error of the original document in the plural conveying paths, timing for draw the original document from the document placing unit to fix an overlap of a trailing edge of the preceding original document and a leading edge of the following original document.

* * * * *